(12) United States Patent
Huang et al.

(10) Patent No.: US 10,359,805 B2
(45) Date of Patent: Jul. 23, 2019

(54) FOLDABLE ELECTRONIC DEVICE

(71) Applicants: Jui-Min Huang, Taipei (TW);
Ching-Tai Chang, Taipei (TW);
Long-Cheng Chang, Taipei (TW);
Sheng-Hung Wang, Taipei (TW);
Meng-Huan Tsai, Taipei (TW);
Po-Hsiang Hu, Taipei (TW);
Ming-Wang Lin, Taipei (TW);
Chuan-Chi Lan, Taipei (TW);
Sheng-Yueh Liao, Taipei (TW);
Ting-Hui Liao, Taipei (TW)

(72) Inventors: Jui-Min Huang, Taipei (TW);
Ching-Tai Chang, Taipei (TW);
Long-Cheng Chang, Taipei (TW);
Sheng-Hung Wang, Taipei (TW);
Meng-Huan Tsai, Taipei (TW);
Po-Hsiang Hu, Taipei (TW);
Ming-Wang Lin, Taipei (TW);
Chuan-Chi Lan, Taipei (TW);
Sheng-Yueh Liao, Taipei (TW);
Ting-Hui Liao, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 15/708,134

(22) Filed: Sep. 19, 2017

(65) Prior Publication Data
US 2018/0081395 A1 Mar. 22, 2018

Related U.S. Application Data

(60) Provisional application No. 62/397,317, filed on Sep. 20, 2016.

(51) Int. Cl.
*G06F 1/16* (2006.01)

(52) U.S. Cl.
CPC .......... *G06F 1/1616* (2013.01); *G06F 1/1601* (2013.01); *G06F 1/1626* (2013.01);
(Continued)

(58) Field of Classification Search
CPC .... G06F 1/1681; G06F 1/1616; G06F 1/1652; G06F 1/1675; G06F 1/1601; G06F 1/1626
See application file for complete search history.

(56) References Cited

U.S. PATENT DOCUMENTS

| 6,267,236 B1* | 7/2001 | Seok ............... A45C 13/002 206/320 |
| 2013/0021762 A1* | 1/2013 | van Dijk ............ G06F 1/1652 361/749 |

(Continued)

FOREIGN PATENT DOCUMENTS

| CN | 102215714 | 4/2014 |
| CN | 204664137 | 9/2015 |

(Continued)

OTHER PUBLICATIONS

"Office Action of Taiwan Counterpart Application," dated Dec. 27, 2017, p. 1-p. 11.

*Primary Examiner* — Dimary S Lopez Cruz
*Assistant Examiner* — Ingrid D Wright
(74) *Attorney, Agent, or Firm* — JCIPRNET

(57) ABSTRACT

A foldable electronic device including a first body, a second body, a hinge module and a shielding sheet is provided. The hinge module is pivotally connected to the first body and the second body. The shielding sheet covers the hinge module. The shielding sheet includes an inner film and an outer film overlapping each other, and the inner film is fixed to the hinge module.

21 Claims, 5 Drawing Sheets

(52) U.S. Cl.
CPC .......... *G06F 1/1652* (2013.01); *G06F 1/1681* (2013.01); *G06F 1/1677* (2013.01); *G06F 1/1679* (2013.01)

(56) References Cited

U.S. PATENT DOCUMENTS

| | | | | |
|---|---|---|---|---|
| 2013/0314611 | A1* | 11/2013 | Okutsu | H04N 5/64 348/739 |
| 2014/0029171 | A1* | 1/2014 | Lee | H05K 7/16 361/679.01 |
| 2014/0042293 | A1* | 2/2014 | Mok | G06F 1/1652 248/682 |
| 2014/0352113 | A1* | 12/2014 | Chen | H04M 1/022 16/366 |
| 2015/0085433 | A1* | 3/2015 | Kim | G06F 1/1641 361/679.01 |
| 2016/0363964 | A1* | 12/2016 | Shi | G06F 1/1681 |

FOREIGN PATENT DOCUMENTS

| | | |
|---|---|---|
| TW | 201608542 | 3/2016 |
| WO | 2014057241 | 4/2014 |

\* cited by examiner

FOLDABLE ELECTRONIC DEVICE

CROSS-REFERENCE TO RELATED APPLICATION

This application claims the priority benefit of U.S. provisional application Ser. No. 62/397,317, filed on Sep. 20, 2016. The entirety of the above-mentioned patent application is hereby incorporated by reference herein and made a part of this specification.

BACKGROUND OF THE INVENTION

Field of the Invention

The invention relates to an electronic device, and more particularly, to a foldable electronic device.

Description of Related Art

For easy portability, notebook computers have been developed to replace desktop computers. A notebook computer includes a first body having a display screen, a second body having a system, and a hinge structure for connecting the first body to the second body. To enable larger-angle opening and closing of the first body and the second body, a dual-shaft hinge structure may be used. However, the internal structure of the dual-shaft hinge structure is likely to be exposed during the opening and closing operations, thus destroying integrity and beauty of the appearance of the notebook computer.

SUMMARY OF THE INVENTION

The invention provides a foldable electronic device in which during a change of a first body and a second body from a closed state to an expanded state, a hinge module can be covered by a shielding sheet.

The foldable electronic device of the invention includes a first body, a second body, a hinge module and a shielding sheet. The hinge module is pivotally connected to the first body and the second body. The shielding sheet covers the hinge module. The shielding sheet includes an inner film and an outer film overlapping each other, and the inner film is fixed to the hinge module.

In an embodiment of the invention, the inner film is a film of low ductility, the outer film is a film of high ductility, and the ductility of the inner film is smaller than the ductility of the outer film.

In an embodiment of the invention, the inner film is a flexible plastic film, a tough metal film, or a composite film including rigid metal and flexible plastic.

In an embodiment of the invention, the outer film is an elastic plastic film, elastic leather or an elastic coating film.

In an embodiment of the invention, the shielding sheet further includes a first deformation section.

In an embodiment of the invention, the shielding sheet further includes a first movable section located on one side of the first deformation section and extending into the first body along a first extension direction.

In an embodiment of the invention, the first movable section further includes a first guide groove parallel to the first extension direction.

In an embodiment of the invention, the first body further includes a first guide portion movably disposed in the first guide groove.

In an embodiment of the invention, when the first body and the second body are closed parallel to each other, the first deformation section has a first closing width, and when the first body and the second body are expanded parallel to each other, the first deformation section has a first expansion width, and the first closing width is smaller than the first expansion width.

In an embodiment of the invention, the shielding sheet further includes a second deformation section, and the shielding sheet further includes a second movable section located on one side of the second deformation section and extending into the second body along a second extension direction. The second movable section further includes a second guide groove parallel to the second extension direction. The second body further includes a second guide portion movably disposed in the second guide groove. When the first body and the second body are closed parallel to each other, the second deformation section has a second closing width. When the first body and the second body are expanded parallel to each other, the second deformation section has a second expansion width, and the second closing width is smaller than the second expansion width.

In an embodiment of the invention, when the first body changes from being closed parallel to the second body to being expanded parallel to the second body, a first displacement of the first guide groove at the first guide portion plus a second displacement of the second guide groove at the second guide portion equals a difference between a sum of the first expansion width and the second expansion width and a sum of the first closing width and the second closing width.

In an embodiment of the invention, the hinge module is a dual-shaft module including a first rotating shaft and a second rotating shaft.

In an embodiment of the invention, the hinge module further includes: a first bracket fixed to the first body and including a first sleeve; a second bracket fixed to the second body and including a second sleeve; and a connection frame including a first connection sleeve and a second connection sleeve opposite each other, wherein the first rotating shaft matches the first sleeve and the first connection sleeve, so as to form a first axis, the second rotating shaft matches the second sleeve and the second connection sleeve, so as to form a second axis, and the first axis and the second axis constitute a geometric plane.

In an embodiment of the invention, the hinge module further includes a fixed plate located between the first bracket and the second bracket.

In an embodiment of the invention, the shielding sheet covers the first bracket, the second bracket, the connection frame and the fixed plate.

In an embodiment of the invention, the hinge module further includes a ridge cover opposite the shielding sheet, and the ridge cover covers the first bracket, the second bracket and the connection frame.

In an embodiment of the invention, the ridge cover is fixed to the connection frame.

In an embodiment of the invention, when the first body and the second body are closed parallel to each other, an orthographic projection of the shielding sheet on the geometric plane is located between the first axis and the second axis.

In an embodiment of the invention, when the first body and the second body are expanded parallel to each other, the orthographic projection of the shielding sheet on the geometric plane overlaps orthographic projections of the first sleeve, the second sleeve and the fixed plate on the geometric plane.

In an embodiment of the invention, the first body is a display module or a touch display module.

In an embodiment of the invention, the second body is a keyboard input module, a touch input module, a keyboard-and-touch input module, a display module or a touch display module.

Based on the above, in the foldable electronic device of the invention, during a change of the first body and the second body from the closed state to the expanded state, the hinge module can be covered by the shielding sheet, so that the foldable electronic device overall has a more beautiful appearance.

To make the above features and advantages of the invention more comprehensible, embodiments accompanied with drawings are described in detail as follows.

DETAILED DESCRIPTION OF DISCLOSED EMBODIMENTS

Figure 1:
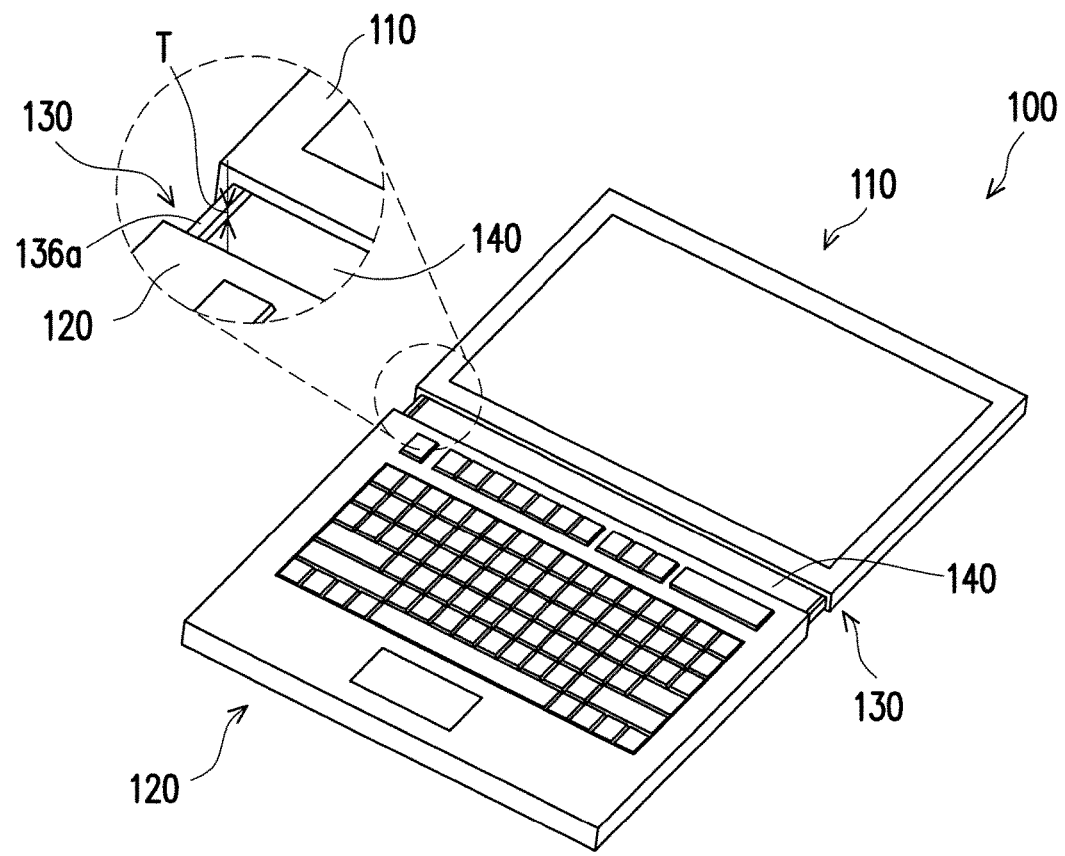
FIG. 1 is a schematic view of a foldable electronic device according to an embodiment of the invention.
Figure 3:
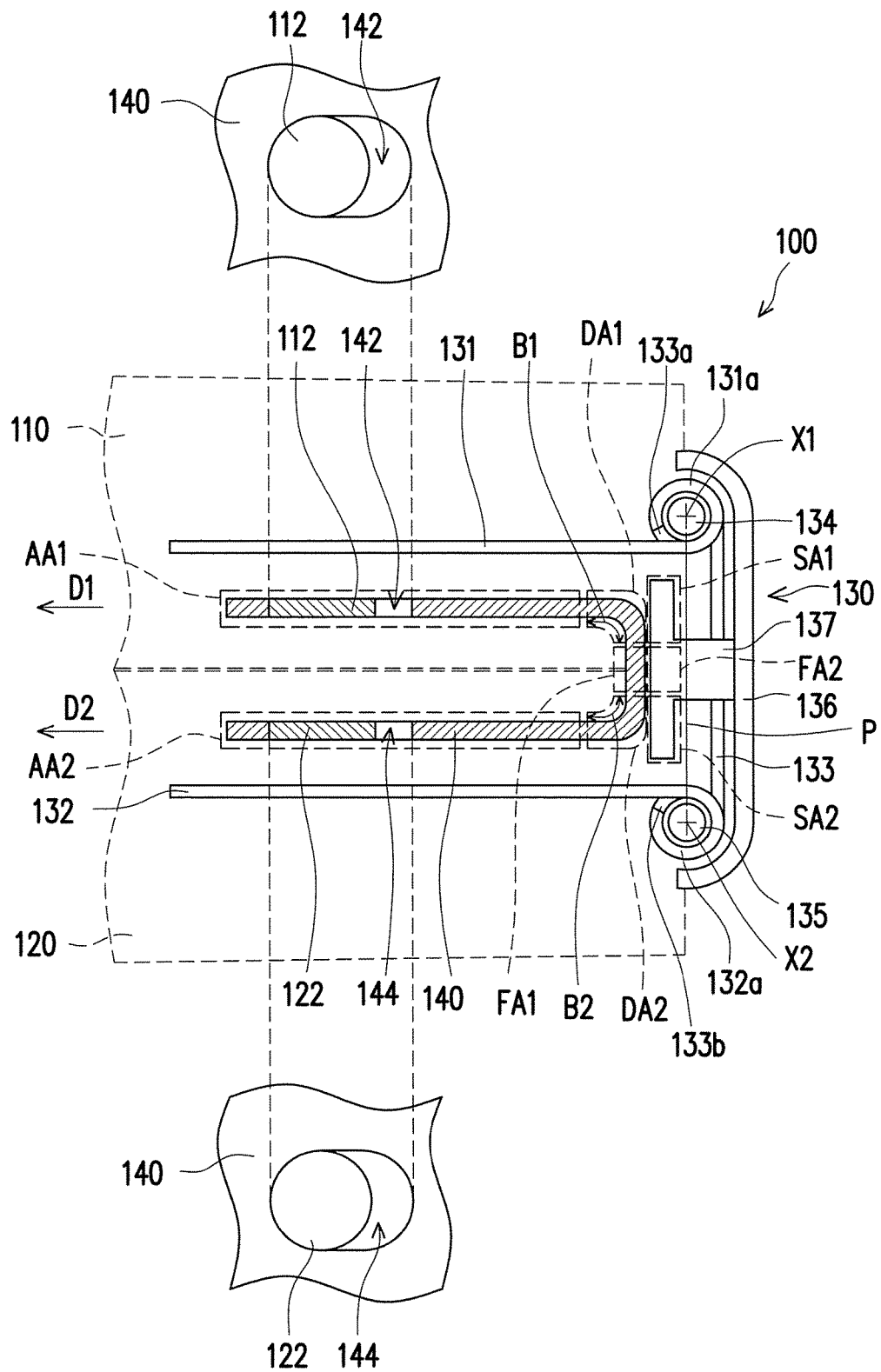
FIG. 3 is a schematic view of the foldable electronic device of FIG. 1 in a closed state.
Figure 5:
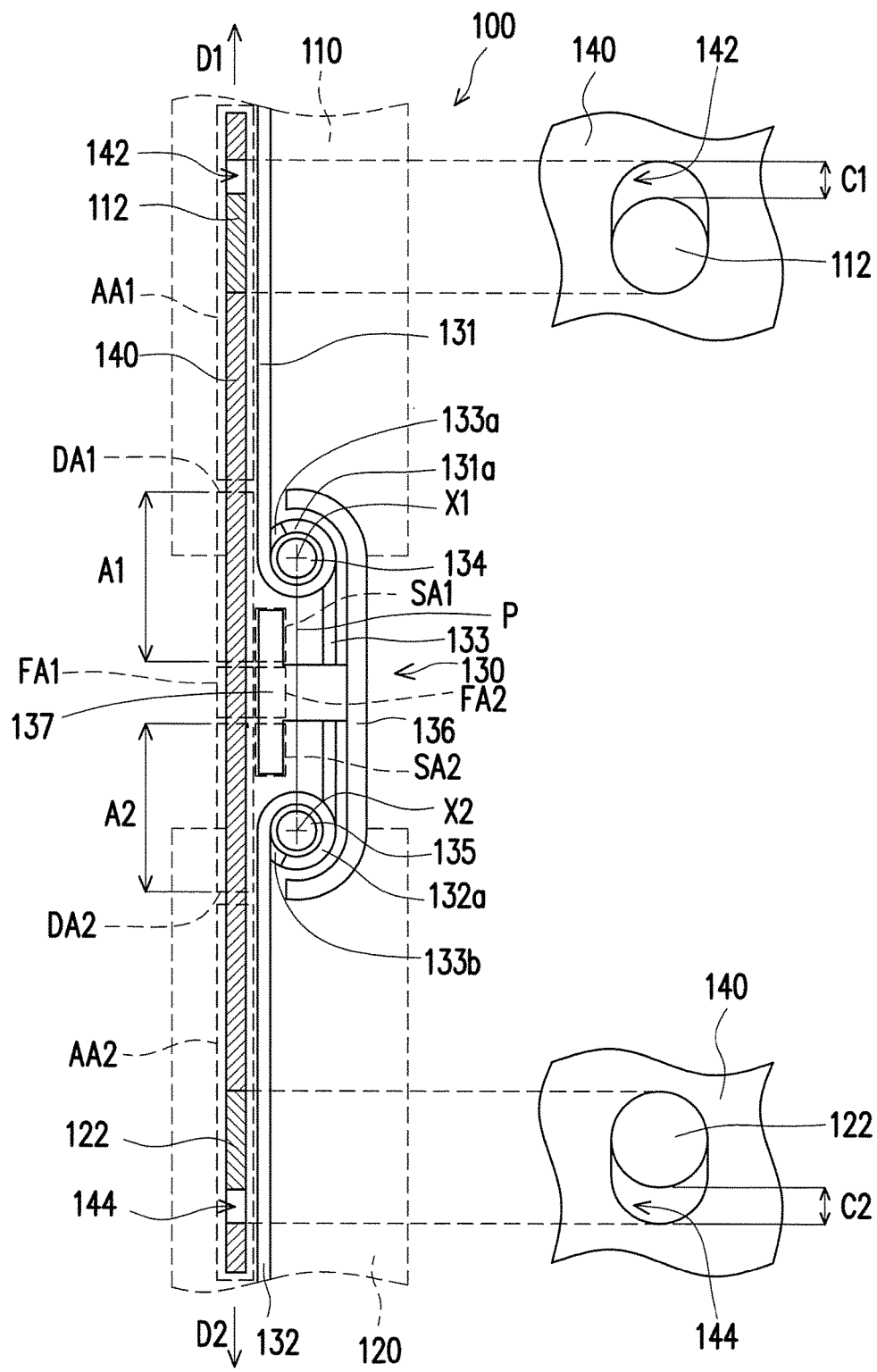
FIG. 5 is a schematic view of the foldable electronic device of FIG. 1 in an expanded state.
Figure 6:
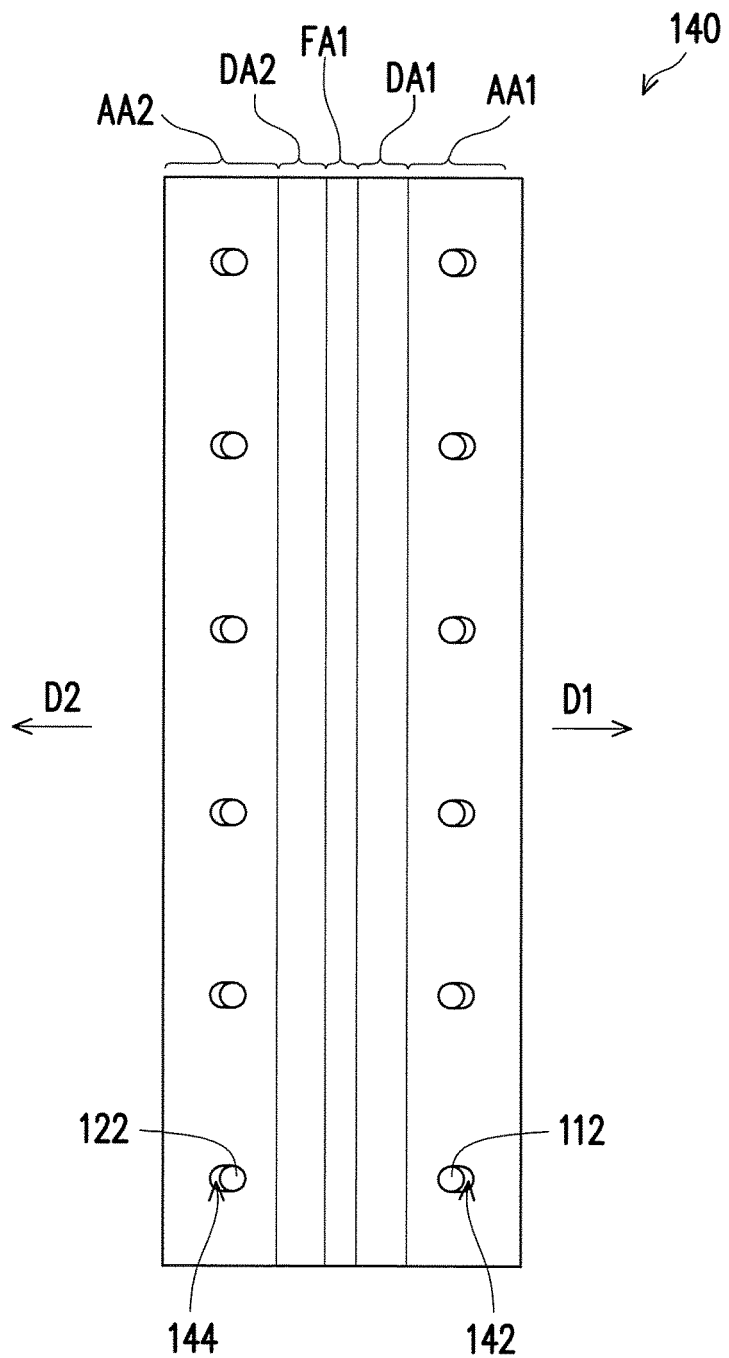
FIG. 6 is a schematic view of the shielding sheet, the first guide portion and the second guide portion of the foldable electronic device of FIG. 5.

Referring to FIG. 1 and FIG. 3, in the present embodiment, a foldable electronic device 100 may be a notebook computer, or a combination of a tablet computer and an expansion base. The invention is not limited thereto. The foldable electronic device 100 includes a first body 110, a second body 120, a hinge module 130 and a shielding sheet 140. The hinge module 130 is pivotally connected to the first body 110 along a first axis X1, and the hinge module 130 is pivotally connected to the second body 120 along a second axis X2. Accordingly, the first body 110 is pivotally rotatable with respect to the hinge module 130 along the first axis X1, and the second body 120 is pivotally rotatable with respect to the hinge module 130 along the second axis X2, so that the first body 110 and the second body 120 are capable of being closed parallel to each other to be in a closed state (as shown in FIG. 3) or being expanded parallel to each other to be in an expanded state (as shown in FIG. 5). Generally, the first body 110 is, for example, a display module or a touch display module, and the second body 120 is, for example, a keyboard input module, a touch input module, a keyboard-and-touch input module, a display module or a touch display module. This is not particularly limited and depends on design needs. The shielding sheet 140 is configured to cover the hinge module 130, and includes a sheet fixed section FA1, a first movable section AA1 and a second movable section AA2. The sheet fixed section FA1 is located between the first movable section AA1 and the second movable section AA2, and the sheet fixed section FA1 is fixed to the hinge module 130.

Figure 4:
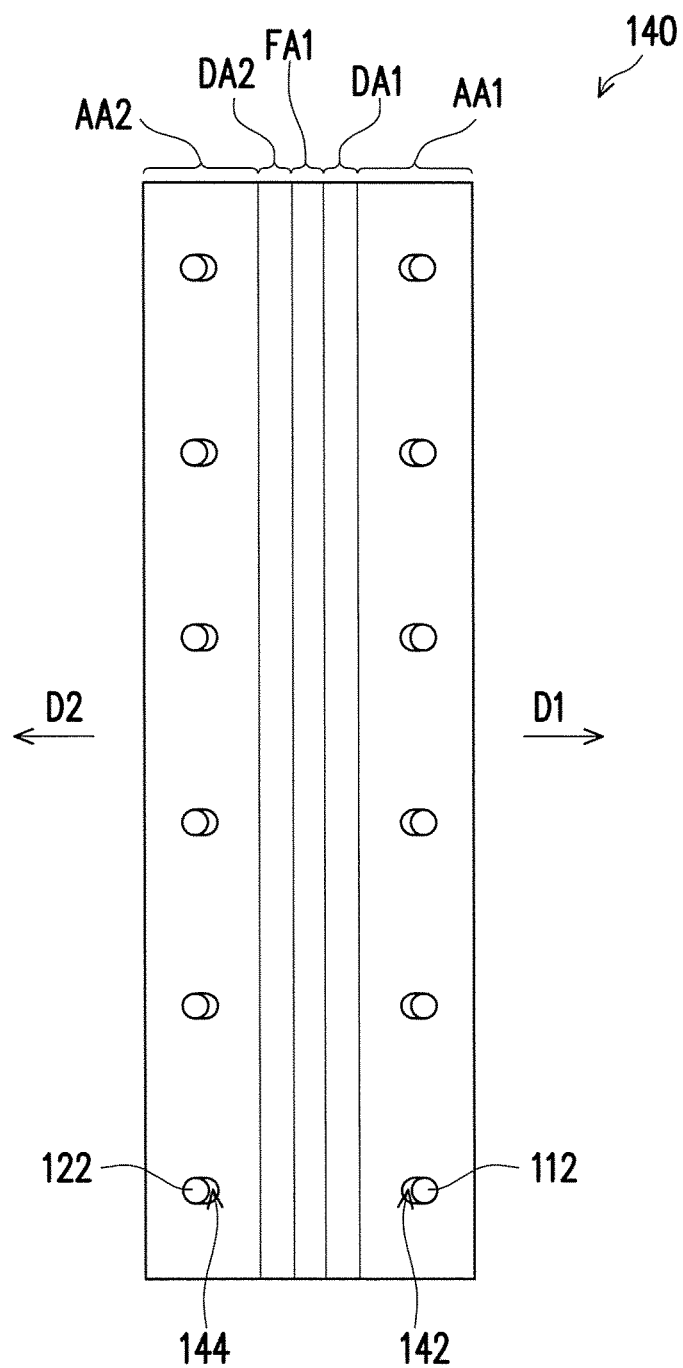
FIG. 4 is a schematic view of the shielding sheet, a first guide portion and a second guide portion of the foldable electronic device of FIG. 3.

Referring to FIG. 1, FIG. 3 and FIG. 4, in the present embodiment, the first body 110 further includes a plurality of first guide portions 112, and the first movable section AA1 of the shielding sheet 140 further includes a plurality of first guide grooves 142. The first movable section AA1 of the shielding sheet 140 extends into the first body 110 along a first extension direction D1. The first guide grooves 142 are parallel to the first extension direction D1, and the first guide portions 112 are respectively movably disposed in the first guide grooves 142. For example, the first guide portions 112 may be respectively movably disposed in the first guide grooves 142 by being mortised with each other, or by riveting. This is not particularly limited. By means of the first guide portions 112 and the first guide grooves 142, the first movable section AA1 of the shielding sheet 140 can slide smoothly with respect to the first body 110.

Referring to FIG. 1, FIG. 3 and FIG. 4, in the present embodiment, the second body 120 further includes a plurality of second guide portions 122, and the second movable section AA2 of the shielding sheet 140 further includes a plurality of second guide grooves 144. The second movable section AA2 of the shielding sheet 140 extends into the second body 120 along a second extension direction D2. The second guide grooves 144 are parallel to the second extension direction D2, and the second guide portions 122 are respectively movably disposed in the second guide grooves 144. For example, the second guide portions 122 may be respectively movably disposed in the second guide grooves 144 by being mortised with each other, or by riveting. This is not particularly limited. By means of the second guide portions 122 and the second guide grooves 144, the second movable section AA2 of the shielding sheet 140 can slide smoothly with respect to the second body 120.

Referring to FIG. 4, the first guide portions 112 and the corresponding first guide grooves 142 may be linearly arranged. In other embodiments not illustrated, the first guide portions 112 and the corresponding first guide grooves 142 may be alternately arranged. This is not particularly limited and depends on design needs. In addition, in the present embodiment, the second guide portions 122 and the corresponding second guide grooves 144 may be linearly arranged. In other embodiments not illustrated, the second guide portions 122 and the corresponding second guide grooves 144 may be alternately arranged. This is not particularly limited and depends on design needs.

Referring to FIG. 4, in the present embodiment, the number of the first guide portions 112 is plural, and the number of the first guide grooves 142 is correspondingly plural. However, in another embodiment not illustrated, as long as the first movable section AA1 of the shielding sheet 140 can slide smoothly with respect to the first body 110 by means of the first guide portion 112 and the first guide groove 142, the number of the first guide portion 112 may be one, and the number of the first guide groove 142 may correspondingly be one. In addition, in the present embodiment, the number of the second guide portions 122 is plural, and the number of the second guide grooves 144 is correspondingly plural. However, in another embodiment not illustrated, as long as the second movable section AA2 of the shielding sheet 140 can slide smoothly with respect to the second body 120 by means of the second guide portion 122 and the second guide groove 144, the number of the second guide portion 122 may be one, and the number of the second guide groove 144 may correspondingly be one.

Referring to FIG. 1 and FIG. 3, the hinge module 130 of the present embodiment is a dual-shaft module. The hinge module 130 includes a first bracket 131, a second bracket 132, a connection frame 133, a first rotating shaft 134 and a second rotating shaft 135. The first bracket 131 is fixed to the first body 110. The second bracket 132 is fixed to the second body 120. The connection frame 133 includes a first connection sleeve 133a and a second connection sleeve 133b opposite each other. The first bracket 131 includes a first sleeve 131a matching the first connection sleeve 133a. The first rotating shaft 134 is inserted into the first sleeve 131a and the first connection sleeve 133a, so as to act in cooperation with the first sleeve 131a and the first connection sleeve 133a, thereby enabling the first bracket 131 and the connection frame 133 to be pivotally rotated with respect to each other along the first axis X1. The second bracket 132 includes a second sleeve 132a matching the second connection sleeve 133b. The second rotating shaft 135 is inserted into the second sleeve 132a and the second connection sleeve 133b, so as to act in cooperation with the second sleeve 132a and the second connection sleeve 133b, thereby enabling the second bracket 132 and the connection frame 133 to be pivotally rotated with respect to each other along the second axis X2. Accordingly, the first body 110 is pivotally rotatable with respect to the hinge module 130 along the first axis X1, and the second body 120 is pivotally rotatable with respect to the hinge module 130 along the second axis X2, so that the first body 110 and the second body 120 are capable of being in the closed state or the expanded state.

Figure 2:
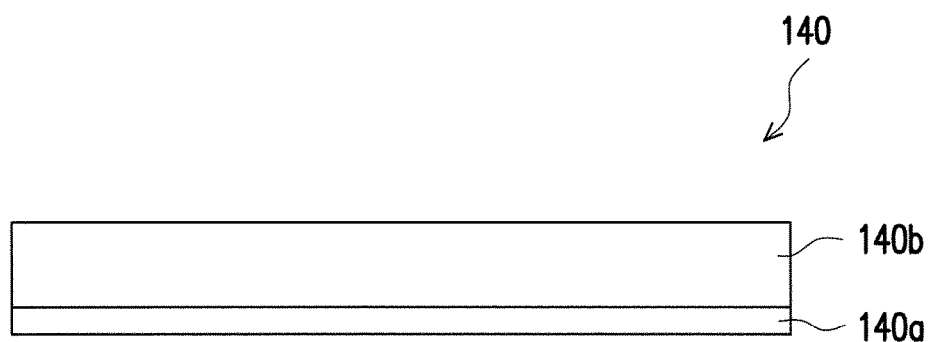
FIG. 2 is a schematic cross-sectional view of a shielding sheet of the foldable electronic device of FIG. 1.

Referring to FIG. 2, in the present embodiment, the shielding sheet 140 may be a sheet structure having ductility and bendability. Specifically, the shielding sheet 140 further includes an inner film 140a and an outer film 140b overlapping each other, and the inner film 140a is fixed to the hinge module 130. In the present embodiment, the inner film 140a may be a film of low ductility, the outer film 140b may be a film of high ductility, and the ductility of the inner film 140a is smaller than the ductility of the outer film 140b, wherein the inner film 140a may be a flexible plastic film, a tough metal film, or a composite film including both rigid metal and flexible plastic. For example, the inner film 140a may be a polyester film, a stainless steel film, or a composite film including both aluminum and polyester film. The outer film 140b may be an elastic plastic film, elastic leather or elastic coating. For example, the outer film 140b may be silica gel or calfskin.

Referring to FIG. 1 and FIG. 3, the hinge module 130 further includes a ridge cover 136 and a fixed plate 137. The ridge cover 136 is fixed to the connection frame 133 and is opposite the shielding sheet 140. Moreover, the ridge cover 136 covers the first bracket 131, the second bracket 132 and the connection frame 133. The fixed plate 137 is fixed to the ridge cover 136 and is located between the first bracket 131 and the second bracket 132. A portion of the shielding sheet 140 is fixed to the fixed plate 137, and the shielding sheet 140 covers the first bracket 131, the second bracket 132, the connection frame 133 and the fixed plate 137.

In detail, the shielding sheet 140 further includes a first deformation section DA1 and a second deformation section DA2. The first movable section AA1 is located on one side of the first deformation section DA1, and the first deformation section DA1 is located between the sheet fixed section FA1 and the first movable section AA1. The second movable section AA2 is located on one side of the second deformation section DA2, and the second deformation section DA2 is located between the sheet fixed section FA1 and the second movable section AA2. The fixed plate 137 further includes a plate fixed section FA2, a first support section SA1 and a second support section SA2, wherein the plate fixed section FA2 is located between the first support section SA1 and the second support section SA2. A portion of the shielding sheet 140 may be fixed to the hinge module 130. In the present embodiment, the inner film 140a of the shielding sheet 140 is fixed to the hinge module 130.

Furthermore, the inner film 140a located in the sheet fixed section FA1 of the shielding sheet 140 may be fixed to the plate fixed section FA2 defined by the fixed plate 137 of the hinge module 130. In the present embodiment, an orthographic projection of the sheet fixed section FA1 on a geometric plane P where the first axis X1 and the second axis X2 are located is located between an orthographic projection of the first sleeve 131a on the geometric plane P and an orthographic projection of the second sleeve 132a on the geometric plane P.

By means of the above structure, the shielding sheet 140 is capable of covering the first bracket 131, the second bracket 132, the connection frame 133 and the fixed plate 137. In other words, the first bracket 131, the second bracket 132, the connection frame 133 and the fixed plate 137 can be hidden inside by the ridge cover 136 and the shielding sheet 140. Moreover, a user can at most see a portion of the outer film 140b of the shielding sheet 140. Thus, integrity and beauty of the appearance of the foldable electronic device 100 can be enhanced.

Referring to FIG. 3, in the present embodiment, when the first body 110 and the second body 120 of the foldable electronic device 100 are in the closed state, an orthographic projection of the shielding sheet 140 on the geometric plane P where the first axis X1 and the second axis X2 are located is located between the first axis X1 and the second axis X2, and the orthographic projection of the shielding sheet 140 on the geometric plane P is located between the orthographic projection of the first sleeve 131a on the geometric plane P and the orthographic projection of the second sleeve 132a on the geometric plane P.

Referring to FIG. 5, in the present embodiment, when the first body 110 of the foldable electronic device 100 with respect to the second body 120 changes from the closed state as in FIG. 3 to the expanded state as in FIG. 5, the orthographic projection of the shielding sheet 140 on the geometric plane P where the first axis X1 and the second axis X2 are located overlaps the orthographic projection of the first sleeve 131a on the geometric plane P, the orthographic projection of the second sleeve 132a on the geometric plane P, and an orthographic projection of the fixed plate 137 on the geometric plane P. Moreover, the first support section SA1 and the second support section SA2 respectively support the first deformation section DA1 and the second deformation section DA2.

Referring again to FIG. 1, the ridge cover 136 has two end portions 136a opposite each other, for covering the connection frame 133, the first rotating shaft 134, the second rotating shaft 135 and the fixed plate 137 as shown in FIG. 3 or FIG. 5 from both ends of the hinge module 130. Since the two end portions 136a of the ridge cover 136 protrude beyond the fixed plate 137 and have a gap T with respect to the shielding sheet 140, the shielding sheet 140 does not protrude beyond the end portions 136a of the ridge cover 136. Therefore, when the first body 110 and the second body 120 are in the expanded state, the shielding sheet 140 is prevented from becoming higher than the end portions 136a of the ridge cover 136, and smoothness and beautiful appearance can thus be maintained.

When the first body 110 and the second body 120 are in the expanded state, the first deformation section DA1 has a first expansion width A1, and the second deformation section DA2 has a second expansion width A2, as shown in FIG. 5. When the first body 110 and the second body 120 of the foldable electronic device 100 are in the closed state, the first deformation section DA1 has a first closing width B1, and the second deformation section DA2 has a second closing width B2, as shown in FIG. 3. When the first body 110 and the second body 120 of the foldable electronic device 100 change from the closed state to the expanded state, the first guide groove 142 has a first displacement C1 at the first guide portion 112, and the second guide groove 144 has a second displacement C2 at the second guide portion 122, as shown in FIG. 5. In the present embodiment, the first displacement C1 of the first guide groove 142 at the first guide portion 112 plus the second displacement C2 of the second guide groove 144 at the second guide portion 122 equals a difference between the sum of the first expansion width A1 and the second expansion width A2 and the sum of the first closing width B1 and the second closing width B2. That is, A1+A2−(B1+B2)=C1+C2. In other words, the first closing width B1 of the first deformation section DA1 is smaller than the first expansion width A1, and the second closing width B2 of the second deformation section DA2 is smaller than the second expansion width A2. That is, B1<A1, and B2<A2. Therefore, the first guide portions 112 and the first guide grooves 142 can provide a buffer against a dimensional change in the first deformation section DA1 of the shielding sheet 140, and the second guide portions 122 and the second guide grooves 144 can provide a buffer against a dimensional change in the second deformation section DA2 of the shielding sheet 140.

In summary, in the foldable electronic device of the invention, during the change of the first body and the second body from the closed state to the expanded state, the members of the hinge module can be covered by the shielding sheet, so that the foldable electronic device overall has a more beautiful appearance. On the other hand, the shielding sheet of the invention is capable of covering the internal members such as the first bracket, the second bracket and the connection frame. Moreover, during the change of the first body and the second body from the closed state to the expanded state, the shielding sheet can be maintained smooth.

Although the invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

What is claimed is:

1. A foldable electronic device, comprising:
   a first body;
   a second body;
   a hinge module pivotally connected to the first body and the second body; and
   a shielding sheet covering the hinge module, the shielding sheet comprising an inner film and an outer film overlapping each other, the inner film being fixed to the hinge module, wherein a sheet fixed section of the shielding sheet and the hinge module do not slide relative to each other, and the sheet fixed section of the shielding sheet is fixed at an inner side of the hinge module.

2. The foldable electronic device according to claim 1, wherein the inner film is a film of low ductility, the outer film is a film of high ductility, and the ductility of the inner film is smaller than the ductility of the outer film.

3. The foldable electronic device according to claim 1, wherein the inner film is a flexible plastic film, a tough metal film, or a composite film comprising rigid metal and flexible plastic.

4. The foldable electronic device according to claim 1, wherein the outer film is an elastic plastic film, elastic leather or an elastic coating film.

5. The foldable electronic device according to claim 1, wherein the shielding sheet further comprises a first deformation section.

6. The foldable electronic device according to claim 5, wherein the shielding sheet further comprises a first movable section located on one side of the first deformation section and extending into the first body along a first extension direction.

7. The foldable electronic device according to claim 6, wherein the first movable section further comprises a first guide groove parallel to the first extension direction.

8. The foldable electronic device according to claim 7, wherein the first body further comprises a first guide portion movably disposed in the first guide groove.

9. The foldable electronic device according to claim 8, wherein when the first body and the second body are closed parallel to each other, the first deformation section has a first closing width, and when the first body and the second body are expanded parallel to each other, the first deformation section has a first expansion width, and the first closing width is smaller than the first expansion width.

10. The foldable electronic device according to claim 9, wherein the shielding sheet further comprises a second deformation section, the shielding sheet further comprises a second movable section located on one side of the second deformation section and extending into the second body along a second extension direction, the second movable section further comprises a second guide groove parallel to the second extension direction, and the second body further comprises a second guide portion movably disposed in the second guide groove, wherein when the first body and the second body are closed parallel to each other, the second deformation section has a second closing width, and when the first body and the second body are expanded parallel to each other, the second deformation section has a second expansion width, and the second closing width is smaller than the second expansion width.

11. The foldable electronic device according to claim 10, wherein when the first body changes from being closed parallel to the second body to being expanded parallel to the second body, a first displacement of the first guide groove at the first guide portion plus a second displacement of the second guide groove at the second guide portion equals a difference between a sum of the first expansion width and the second expansion width and a sum of the first closing width and the second closing width.

12. The foldable electronic device according to claim 1, wherein the hinge module is a dual-shaft module comprising a first rotating shaft and a second rotating shaft.

13. The foldable electronic device according to claim 12, wherein the hinge module further comprises:
   a first bracket fixed to the first body and comprising a first sleeve;
   a second bracket fixed to the second body and comprising a second sleeve; and a connection frame comprising a first connection sleeve and a second connection sleeve opposite each other, wherein the first rotating shaft matches the first sleeve and the first connection sleeve, so as to form a first axis, the second rotating shaft matches the second sleeve and the second connection sleeve, so as to form a second axis, and the first axis and the second axis constitute a geometric plane.

14. The foldable electronic device according to claim 13, wherein the hinge module further comprises a fixed plate located between the first bracket and the second bracket.

15. The foldable electronic device according to claim 14, wherein the shielding sheet covers the first bracket, the second bracket, the connection frame and the fixed plate.

16. The foldable electronic device according to claim 14, wherein the hinge module further comprises a ridge cover opposite the shielding sheet, and the ridge cover covers the first bracket, the second bracket and the connection frame.

17. The foldable electronic device according to claim 16, wherein the ridge cover is fixed to the connection frame.

18. The foldable electronic device according to claim 14, wherein when the first body and the second body are expanded parallel to each other, an orthographic projection of the shielding sheet on the geometric plane overlaps orthographic projections of the first sleeve, the second sleeve and the fixed plate on the geometric plane.

19. The foldable electronic device according to claim 13, wherein when the first body and the second body are closed parallel to each other, an orthographic projection of the shielding sheet on the geometric plane is located between the first axis and the second axis.

20. The foldable electronic device according to claim 1, wherein the first body is a display module or a touch display module.

21. The foldable electronic device according to claim 1, wherein the second body is a keyboard input module, a touch input module, a keyboard-and-touch input module, a display module or a touch display module.

\* \* \* \* \*